United States Patent [19]
Neville

[11] Patent Number: 5,865,586
[45] Date of Patent: Feb. 2, 1999

[54] REMOVABLE LOG COUPLING DEVICE

[75] Inventor: Richard L. Neville, Victor, Mont.

[73] Assignee: Nevilog, Inc., Victor, Mont.

[21] Appl. No.: 15,024

[22] Filed: Jan. 28, 1998

[51] Int. Cl.$^6$ .............................. F16B 15/00; F16B 15/02
[52] U.S. Cl. ........................ 411/459; 411/460; 411/475
[58] Field of Search .................. 411/456–463, 921, 411/473, 474, 475

[56] References Cited

U.S. PATENT DOCUMENTS

| | | |
|---|---|---|
| 78,341 | 5/1868 | Van Ornum . |
| 322,581 | 7/1885 | Clark . |
| 717,058 | 12/1902 | Walsh, Jr. . |
| 797,083 | 8/1905 | Stowe . |
| 813,714 | 2/1906 | Ketcham . |
| 891,602 | 6/1908 | De Marey . |
| 925,638 | 6/1909 | Kerr ......................................... 411/458 |
| 1,598,199 | 8/1926 | Johansson et al. . |
| 1,612,955 | 1/1927 | Valberg . |
| 1,677,092 | 7/1928 | Jensen . |
| 1,806,522 | 5/1931 | Gruyter . |
| 2,092,684 | 9/1937 | Uhl . |
| 2,100,415 | 11/1937 | Theodorsen . |
| 2,128,844 | 8/1938 | Myer et al. . |
| 2,134,765 | 11/1938 | Putnam . |
| 2,290,855 | 7/1942 | Myer . |
| 2,358,490 | 9/1944 | Corral ..................................... 411/457 |
| 2,370,912 | 3/1945 | Pierce . |
| 2,558,132 | 6/1951 | Green . |
| 2,879,816 | 3/1959 | Cook et al. . |
| 3,323,566 | 6/1967 | Hitt . |
| 3,693,496 | 9/1972 | Koide . |
| 3,841,195 | 10/1974 | Jureit . |
| 4,398,579 | 8/1983 | Holdahl et al. . |
| 4,429,500 | 2/1984 | Farmont ................................. 411/458 |

FOREIGN PATENT DOCUMENTS

| | | | |
|---|---|---|---|
| 0829385 | 1/1952 | Germany ................................ 411/457 |
| 0384844 | 2/1965 | Switzerland ........................... 411/459 |
| 0203030 | 8/1923 | United Kingdom ................... 411/459 |

*Primary Examiner*—Flemming Saether
*Attorney, Agent, or Firm*—Wells, St. John, Roberts, Gregory & Matkin P.S.

[57] ABSTRACT

An apparatus for securing one log to another during a log machining process. The apparatus has a main body which is shaped in the form of an essentially flat disk. Each side of the disk has at least two protrusions or prongs which are oriented perpendicular to the disk and terminate in a tapered end allowing the protrusion to be driven into a log. The protrusions taper down to a base which is attached to the main body. The main body and protrusions are sized and configured to provide a striking surface between the protrusions to allow a blunt instrument such as a small sledge hammer to be applied to the device to drive it into a log. The device may be further provided with a raised surface portion in the striking surface area, and preferably between the protrusions, to provide a standoff distance between the log and the main body such that the apparatus may be pried loose from the log.

32 Claims, 3 Drawing Sheets

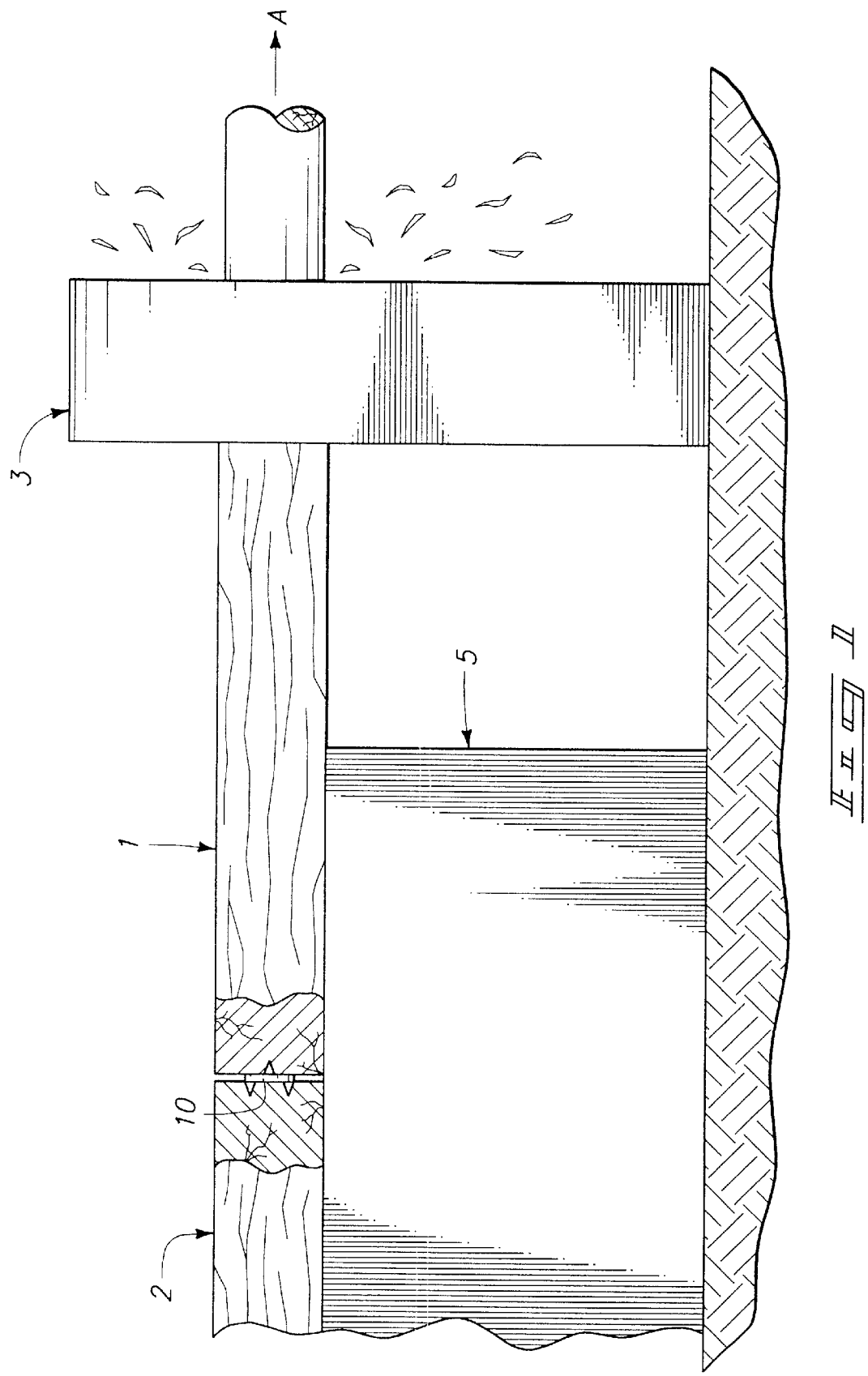

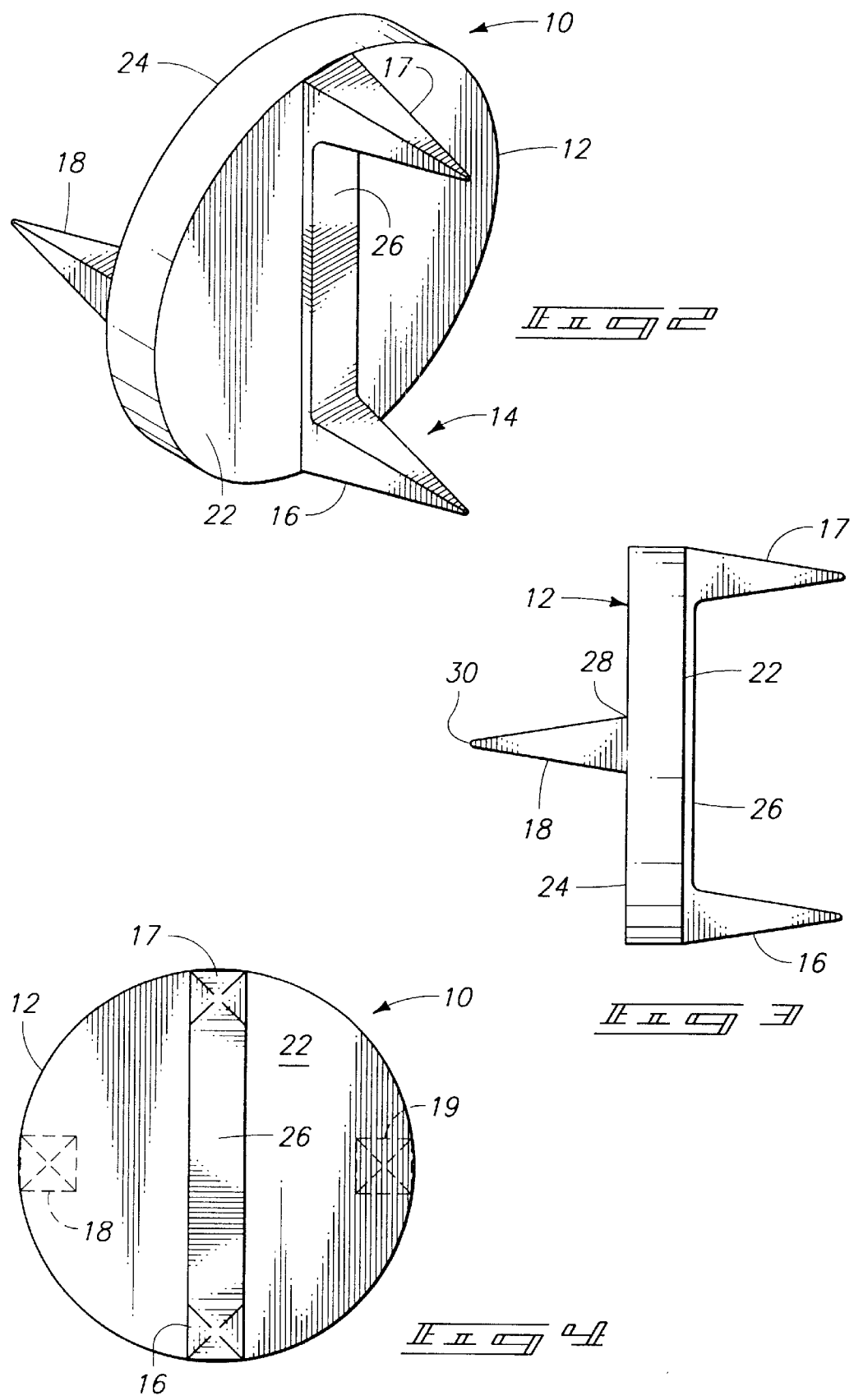

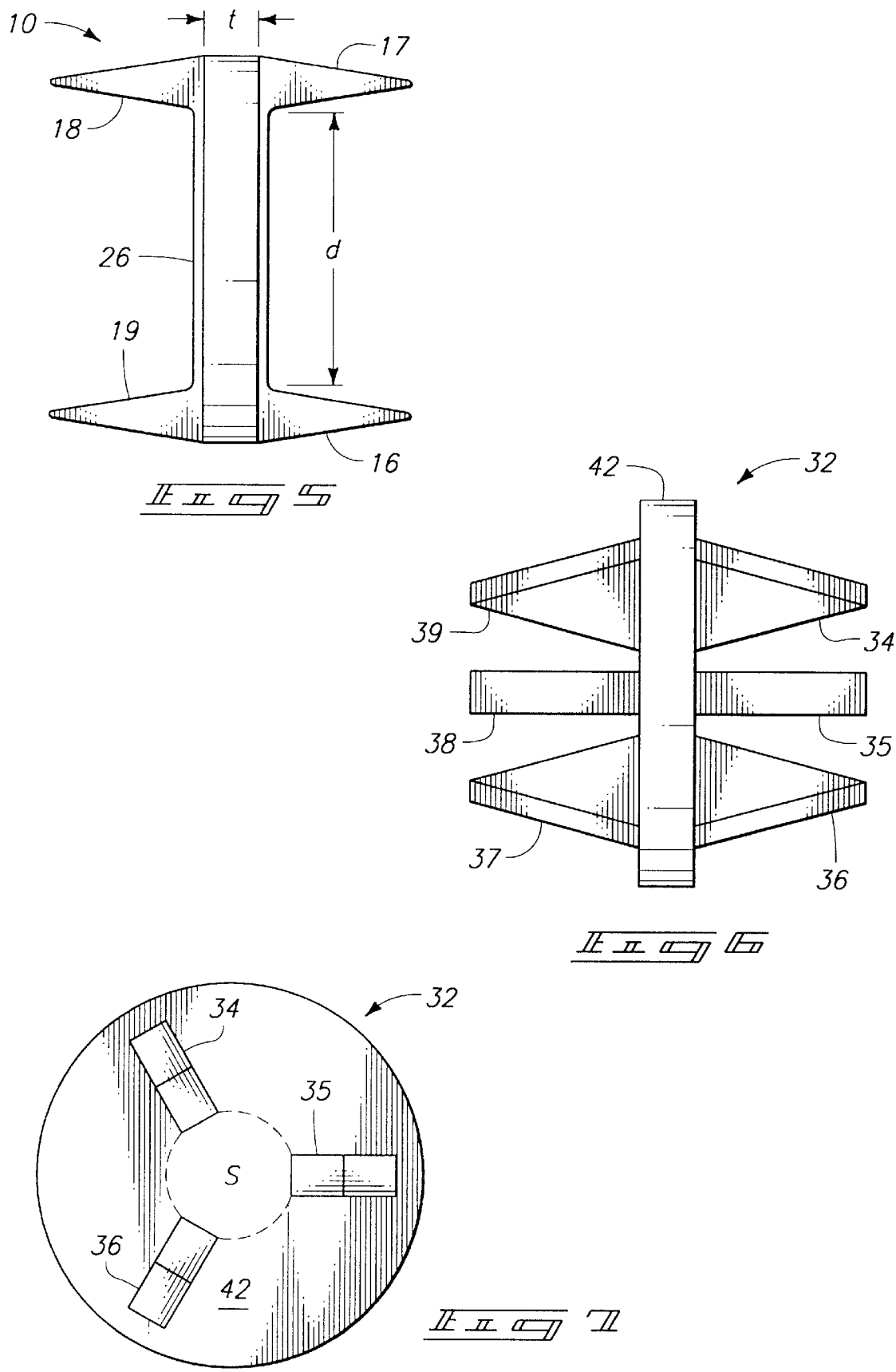

REMOVABLE LOG COUPLING DEVICE

TECHNICAL FIELD

The invention pertains to a apparatus for securing logs during machining processes, and more particularly to an apparatus which connects a first log to a second log within a log lathe.

BACKGROUND OF THE INVENTION

In the manufacturing of log homes and other structures manufactured out of logs, the raw timber must be machined to make a log of essentially consistent diameter over the length of the log. Such is accomplished by passing the log through a log lathe. Log lathes typically comprise a ring-shaped drum having a series of knives disposed around the inner portion of the ring. The drum is rotated relative to a stationary log and the log is pushed in a forward direction through the rotating ring. As the log passes through the ring, the blades that are secured to the ring engage the log and remove material from the outer surface of the log. Such is shown in FIG. 1 wherein the log 1 passes through log lathe 3 in direction A. The rotating drum or ring is within lathe 3 and is not shown in this figure. It is desirable that the log 1 should remain essentially stationary with respect to the lathe except for movement in the forward direction.

As the log passes through the lathe and the blades engage the log, a certain rotational force is imparted to the log by the blades. At a certain point these rotational forces may become sufficient to cause the log to rotate in the lathe along with the rotating drum. If the log rotates or is "slipping" with respect to the log lathe, then the efficiency of the cutting process is reduced. At a certain point, the rotational speed of the log may be matched by that of the rotating drum, at which point no further machining of the log occurs. It is thus desirable to find a way to retain the log in a stationary rotational position with respect to the log lathe as the log is passed through the lathe.

Another problem encountered in machining logs in the method described above is that the log may begin to vibrate as a result of the cutting forces being imparted to the log. The vibration may become serious and even dangerous if the critical frequency is reached where the forces input to the log by the cutting device causes the log to vibrate in ever increasing amplitudes. At a certain point, the log may actually break free of the lathe due to these forces. When the log breaks free, damage to the equipment may occur as well as endangerment of operator safety. It is therefore desirable to find a method to reduce the potential for vibration of logs as they pass through the log lathe.

BRIEF DESCRIPTION OF THE DRAWINGS

Preferred embodiments of the invention are described below with reference to the following accompanying drawings.

FIG. 1 is an environmental view showing the apparatus of the present invention as it would be used to secure logs in a log lathe. The log and log lathe are shown in side elevation view.

FIG. 2 is an isometric drawing of one embodiment of the apparatus of the present invention.

FIG. 3 is a side view of the apparatus shown in FIG. 2.

FIG. 4 is a front elevation view of the apparatus shown in FIG. 2.

FIG. 5 is an alternate embodiment of the apparatus of the present invention which shown in FIG. 2.

FIG. 6 is a side elevation view of an alternate embodiment of the apparatus of the present invention.

FIG. 7 is a front elevational view of the alternate embodiment of the apparatus of the present invention which is shown in FIG. 6.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

As described above, logs which are machined or "turned" in a machining process in the fabrication of log homes and other log structures are typically supported on a log support 5 as they pass through lathe 3 as shown in FIG. 1. The frictional forces between log 1 and the log support 5 are usually relied upon to resist the torque imparted to the log by the lathe and prevent the log from rotating with respect to the lathe. Often however the log support does not provide sufficient resistance to keep the log from turning or from vibrating within the lathe.

I have discovered that by coupling a log which is currently being machined within the lathe with the log which will be next feed into the lathe following the log which is currently being machined, sufficient additional resistive forces can be obtained to prevent the log from turning. By coupling the logs, the lathe must impart sufficient torque not only to cause the log currently being machined to turn, but the log behind it as well. Where operations permit coupling of multiple logs, additional resistive forces may be obtained by connecting as many logs as can be aligned to be fed into the lathe as possible.

Further, by coupling two logs together, the vibrational forces which may be imparted to the log by the lathe will produce a lower amplitude of vibration and the coupled logs then will be produced in a single log. Thus, coupling logs together reduces the tendency for a log to vibrate to an unsafe amplitude while being fabricated, reducing the risk of injury to personnel and damage to equipment.

In addition to securing two logs together, the apparatus should be easy to remove from the logs such that after a log is passed through the lathe, the apparatus may be reclaimed and reused on other logs. In addition, the apparatus needs to be designed such that the log can pass through the lathe with the apparatus in place yet still allow the log to be machined without contacting the apparatus or interfering with the apparatus or the log machining process.

The apparatus should also be configured such that minimal damage is caused to the logs when the apparatus is in place, and further the apparatus should be durable to withstand the somewhat significant forces that may be imparted to it during the machining process as well as the general handling conditions which are generally encountered in log turning processes.

I have invented an apparatus which accomplishes all of the above objectives. FIG. 2 shows an isometric diagram of one embodiment of my invention. In FIG. 2, the apparatus 10 comprises a main body 12. While shown in FIG. 2 as a disk-shaped component, the main body may be square or other shape. However, the main body should be no larger in its major dimension that any part of the main body extends beyond the edge of a log after the log has been machined. Thus, the major diameter of the main body should be selected according to the operations to be performed. For example, where logs are turned to a diameter of not less than 12 inches, a log securing device having a major diameter or 6 inches of less would be sufficient to ensure that the apparatus does not interfere with the log machining process. Since the apparatus may need to be installed quickly, a fair degree of undersizing beyond the maximum size of the log to be machined should be used when selecting the major dimension of the log securing base.

The main body or base is defined by a thickness T as shown in FIG. 5. The thickness of the main body should be selected to resist the forces that are needed to install the device into a log. The thickness of the main body will also depend on the material selected. Where the main body is fabricated from carbon steel such as carbon plate steel, the main body should preferably be of a thickness of at least about 6 mm (0.25 in.). More preferably, the main body, when fabricated from carbon steel plate, has a thickness of between about 6 mm (0.25 in.) and 12 mm (0.5 in.), and is most preferably about 9 mm (0.375 in.) in thickness.

Disposed on the log securing main body 12 are log engaging protrusions or prongs 14 which preferably extend essentially perpendicular from the main body 12. The prongs should be rigidly attached to the main body by welding or brazing or the like. Protrusions having a threaded stud at the base thereof which engage a threaded hole in the main body 12 may also be used, although this is less preferable since it may increase manufacturing costs of the apparatus.

The log engaging apparatus 10 preferably includes at least two protrusions 14 on each side of the apparatus. This allows a torque force or moment to be imparted to each log. If only one protrusion is used on a side of the log securing device, then there will be a tendency for the device to rotate within the log about that single protrusion.

Turning to FIG. 4, it can be seen that four prongs, 16, 17, 18, and 19, are attached to the apparatus 10. FIG. 4 is a front elevational view of the apparatus shown in FIG. 2, although the view shown in FIG. 2 does not show the fourth protrusion 19. FIG. 3 is a side elevation view of the apparatus of FIG. 2 and again the fourth protrusion 19 is not seen as it is blocked by the third protrusion 18. FIG. 3 does show that the prongs are preferably mounted at the outer periphery of the main body 12 as indicated at protrusions or prongs 16 and 17.

Turning briefly to FIG. 6, an embodiment of the present invention wherein three protrusions are disposed on each side of the main body 42 as shown. The apparatus 32 has protrusions 34, 35, and 36 attached to a first side of the main body 42, and protrusions 37, 38, and 39 attached to a second side of the main body. FIG. 7 shows the disposition of the protrusions on a first side of the main body 42 of the apparatus shown in FIG. 6. FIG. 7 also shows the less preferred embodiment wherein the protrusions are not disposed at the outer periphery of the main body.

Returning to FIG. 4, it is seen that the protrusions are preferably oriented such that they are spaced equidistantly about the periphery of the apparatus. This equidistant spacing is also demonstrated in FIG. 7. Returning to FIG. 4, an embodiment in which protrusions 16 and 17 on one side of the main body 12 are oriented at a 90 degree rotation with respect to protrusions 18 and 19 on the other side of the main body is shown. FIG. 5 shows a embodiment in which the apparatus has two prongs on each side and in which the prongs or protrusions are oriented such that their locations on each side of the main body are coincident with one another.

The prongs or protrusions preferably comprise pyramidical—or tetrahedronal—shaped components. As shown in FIG. 3, the protrusions are attached to the main body 12 at their base 28 having their tip 30 distal from the main body. The tips are preferably slightly rounded as shown which helps to ensure that the protrusion does not engage the log too tightly to resist easy removal. An alternate shape for the protrusions is shown in FIG. 6 wherein the protrusions are wedge-shaped pieces. The protrusions should be designed such that they are sufficiently strong to resist bending forces when being inserted into a log. Other shapes which are not shown such as a conical shape or a three-sided pyramid shape may also be employed.

The protrusions are selected to be of a length sufficient to engage a log yet not so long that they become difficult to remove from the log when recovering the apparatus. Preferably the protrusions are not less than 2.5 cm (1 in.) in height. More preferably, the protrusions are between about 3.7 cm (1.5 in.) and 5 cm (2 in.) in height. This dimension ensures that the apparatus will engage the log, but will remain relatively easy to remove, and will not impart a large amount of damage to the log.

In normal operation the apparatus is installed in a log by hitting the apparatus with a blunt device. In order to ensure that the blunt device does not strike one of the protrusions, a sufficiently large and open striking surface is advantageously provided on each side of the apparatus. Turning to FIG. 5, the striking surface in the apparatus can as defined by the distance D between the first protrusion 16 and the second protrusion 17. This dimension between the protrusions defines the minimum dimension of the striking surface. Turning to FIG. 2, it can be seen that a larger dimension for the striking surface is the diameter of the main body 12 which is perpendicular to the line running between the first protrusion 16 and second protrusion 17. However, as indicated, the minimum striking surface dimension is of main importance since this may limit the size and design of the blunt instrument which is used to strike the apparatus to engage it in the log.

A striking surface of at least about 5 cm$^2$ (1 sq. in.) in size is preferably provided. For example, turning to FIG. 7, the area indicated by the letter S confined within the dashed lines would be considered the primary striking surface for the embodiment of the apparatus as shown in that figure. More preferably, the size of the striking area is at least about 10 cm$^2$ (1.8 sq. in.) in size. Even more preferably, the striking surface is at least about 300 cm$^2$ (10 sq. in.) in size. This provides a minimum dimension of the striking surface of 9 cm (3.5 in.) when the striking surface is circular in shape. This dimensions should easily accept the head of a standard five pound sledge hammer, which is a common tool advantageously employed to engage the log securing device into a log.

The size of the striking surface as well as the spacing between the protrusions, the major dimension of the main body 12 and the height of the protrusions 14 are optimally selected such that the apparatus may be secured with a single blow from a blunt tool such as a five pound sledge hammer. If the protrusions are too long, then more than a single blow will be required. Also, if the protrusions are spaced too far apart then more than one blow will be required since a large moment will be imparted to the protrusion as it is engaged into the log. I have found that having a main body diameter of about 10 cm (4 in.), a protrusion height of between about 2.5 and 3.5 cm (1.5 to 2 in.), and a main body thickness of about 10 mm (0.375 in.), and using two protrusions on each side of the main body, produces the optimal results to allow quick engagement of the apparatus into the log by a single blow from a five pound sledge hammer, and will also allow for easy removal of the device from the log.

To further aide easy removal of the device from a log after it has been engaged thereon, I have found that providing a ridge or a raised surface segment 26 as shown in FIG. 2 is beneficial. The raised surface portion 26 will allow the device to be driven into the log only until the outer surface of the raised surface portion butts up against the log. There will thereafter be provided a small gap between the log and the first face 22 of the main body. This small gap or space allows for a screw driver or other prying device to be inserted between the log and the apparatus to pry the apparatus loose from the log. The revised section may be fabricated by applying a series of weld beads to the main body to build up the ridge 26.

The raised section 26 on the main body 12 also provides a primary striking contact area for the instrument which is used to strike the apparatus when inserting the protrusions into a log. This ensures that the striking forces are imparted along a line between the protrusions and is not off center, causing the protrusions to engage at an angle or not fully engage into the log.

The apparatus is preferably constructed of a strong material such as carbon steel. Additionally, fabricating the apparatus from a metal such as carbon steel allows for low material cost and low fabrication cost thereby reducing the overall fabrication costs of the apparatus.

OPERATION OF THE APPARATUS

In operation, the apparatus is positioned proximate to the face or end of a log to be machined. Referring to FIG. 1, the apparatus is positioned such that no part of the main body 12 extends into the area to be machined. The apparatus is preferably held at or about the outer periphery of the main body 12. The apparatus is stuck with a blunt instrument such as a five pound sledge hammer to engage it onto the log. More preferably, the apparatus is struck on the raised surface portion 26 to concentrate the resulting forces into the protrusions 18 and 19. The log with the apparatus thus secured thereto is then shoved or pushed against another log not having a securing apparatus attached to its face. When the two logs are butted together, the first end of the apparatus having protrusions 16 and 17 is engaged to the end or face of the second log. The apparatus continues to engage the log until the log contacts the apparatus at the raised surface portion 26. The logs are thusly connected to one another to resist rotational torquing forces as well as vibrational forces imparted by the log lathe.

Once the connection between the first log and the second log has passed through the log lathe, the most recently machined log may be removed from the log immediately following it by inserting a prying device between the two logs and prying them apart. The apparatus may remain with the log which is currently being machined or it may be removed with the log which has just been machined. The log on which the apparatus remains will depend on which log it has engaged more securely. In any event, the apparatus may then be removed from the log to which it is attached by inserting a screw driver or other prying device between the log and the face of the log securing device and prying the device free from the log.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A removable log coupling device, comprising:
    a. a main body comprising an essentially flat plate having a first side and a second side;
    b. a plurality of log engaging protrusions disposed on each side of said main body, said protrusions being disposed such that a striking surface is defined on at least one side of said main body, said striking surface sized to receive a striking device; and
    c. a raised surface segment disposed on said first and second sides of said main body and extending across said striking surfaces between said protrusions.

2. The device of claim 1 wherein said protrusions taper from a first end connected to said main body to a second end distal from said main body.

3. The device of claim 1 wherein said protrusions are essentially pyramidical in shape having bases thereof, said bases being connected to said main body.

4. The device of claim 1 wherein said protrusions are essentially tetrahedronal in shape, having bases thereof, said bases being connected to said main body.

5. The device of claim 1 wherein said main body is essentially round in shape.

6. The device of claim 1 having no more than two protrusions on at least one side of said main body.

7. The device of claim 1 having no more than two protrusions on each side of said main body.

8. The device of claim 7 wherein, on each side of said main body, said protrusions are oriented such that said protrusions are diametrically opposed to one another.

9. The device of claim 8 wherein said protrusions on said first side of said main body are oriented at a ninety degree rotation with respect to said protrusions on said second side of said main body.

10. The device of claim 1 wherein said main body is bounded by a periphery, and wherein said protrusions are disposed on each said of said main body proximate to said periphery.

11. The device of claim 1 wherein said striking surface is provided on each side of said main body.

12. The device of claim 1 wherein:
    a. said striking surface has a center of gravity defined by the center of gravity of an equivalent plane surface;
    b. said main body has a center of gravity defined by the center of gravity of an plane surface equivalent to one of said sides; and
    c. said center of gravity of said striking surface is essentially coincident with said center of gravity of said main body.

13. The device of claim 1 wherein said protrusions protrude from said main body at least 2.5 cm.

14. The device of claim 1 wherein said protrusions protrude from said main body at least 3.7 cm.

15. The device of claim 1 wherein said protrusions protrude from said main body at least 5 cm.

16. The device of claim 1 wherein said protrusions on said first side of said main body are oriented at a ninety degree rotation with respect to said protrusions on said second side of said main body.

17. The device of claim 1 wherein said striking surface is at least 5 $cm^2$ in size.

18. The device of claim 1 wherein said striking surface is at least 10 $cm^2$ in size.

19. The device of claim 1 wherein said striking surface is at least 300 cm² in size.

20. The device of claim 1 wherein said main body is defined by a thickness between said first side and said second side, wherein said thickness is at least 6 mm in height.

21. The device of claim 1 wherein said main body is defined by a thickness between said first side and said second side, wherein said thickness is at least 9 mm in height.

22. The device of claim 1 wherein said main body is defined by a thickness between said first side and said second side, wherein said thickness is at least 12 m in height.

23. The device of claim 1 having no more than three protrusions on at least one side of said main body.

24. The device of claim 1 having no more than three protrusions on each side of said main body.

25. The device of claim 24 wherein, on each side of said main body, said protrusions are oriented such that said protrusions are equidistantly spaced apart from one another.

26. The device of claim 25 wherein said protrusions on said first side of said main body are oriented at a sixty degree rotation with respect to said protrusions on said second side of said main body.

27. The device of claim 1 wherein said device is fabricated from sheet steel.

28. A removable log coupling device, comprising:
   c. a main body comprising an essentially flat steel plate having a first side and a second side;
   d. a plurality of log engaging protrusions welded onto on each side of said main body, said protrusions being disposed in spaced relation across said main body, and wherein each of said protrusions taper from an enlarged first end welded to said main body to a reduced second end distal from said main body; and
   e. raised surface segments disposed on the first and second sides of said main body and extending across said striking surface between said protrusions.

29. The device of claim 28 wherein said main body is bounded by a periphery, and wherein said protrusions are disposed on each side of said main body proximate to said periphery.

30. The device of claim 28 having no more than two protrusions on each side of said main body, wherein, on each side of said main body, said protrusions are oriented such that said protrusions are diametrically opposed to one another.

31. The device of claim 30 wherein said protrusions on said first side of said main body are oriented at a ninety degree rotation with respect to said protrusions on said second side of said main body.

32. The device of claim 31 wherein:
   a. said protrusions protrude from said main body at least 2.5 cm;
   b. said striking surface is at least 200 cm² in size; and
   c. said main body is defined by a thickness between said first side and said second side, said thickness being at least 9 mm in height.

* * * * *

UNITED STATES PATENT AND TRADEMARK OFFICE
CERTIFICATE OF CORRECTION

PATENT NO. : 5,865,586
DATED : February 2, 1999
INVENTOR(S) : Richard L. Neville It is certified that error appears in the above-identified patent and that said Letters Patent is hereby corrected as shown below:

Column 1, line 67, after "which" insert --is--.

Signed and Sealed this

Third Day of August, 1999

Attest:

Attesting Officer

Q. TODD DICKINSON

Acting Commissioner of Patents and Trademarks